(12) United States Patent
Ward

(10) Patent No.: US 6,405,681 B1
(45) Date of Patent: Jun. 18, 2002

(54) CHEW TOY

(75) Inventor: William A. Ward, 429 Clinton Ave., Apt. 42, Brooklyn, NY (US) 11238

(73) Assignee: William A. Ward, Cold Springs, NY (US)

( * ) Notice: Subject to any disclaimer, the term of this patent is extended or adjusted under 35 U.S.C. 154(b) by 0 days.

(21) Appl. No.: 09/621,405

(22) Filed: Jul. 21, 2000

(51) Int. Cl.$^7$ ............................................... A01K 29/00
(52) U.S. Cl. ......................................................... 119/707
(58) Field of Search ............................... 119/794, 769, 119/792, 793, 795, 796, 797, 798, 856, 863

(56) References Cited

U.S. PATENT DOCUMENTS

| | | |
|---|---|---|
| 1,149,170 A | 8/1915 | Allis |
| 2,718,873 A | 9/1955 | Buckner |
| 4,364,925 A | 12/1982 | Fisher |
| 4,802,444 A | 2/1989 | Markham et al. |
| 4,928,632 A | 5/1990 | Gordon |
| 5,033,410 A | 7/1991 | Sigurdsson |
| 5,191,856 A | 3/1993 | Gordon |
| 5,329,881 A | 7/1994 | O'Rourke |
| 5,467,741 A | 11/1995 | O'Rourke |
| 5,857,431 A * | 1/1999 | Peterson ...................... 119/710 |
| 5,944,516 A | 8/1999 | Deshaies |
| 6,044,800 A | 4/2000 | Kubo et al. |
| 6,186,095 B1 * | 2/2001 | Simon ......................... 119/707 |

* cited by examiner

*Primary Examiner*—Thomas Price
(74) *Attorney, Agent, or Firm*—Dority & Manning

(57) ABSTRACT

An animal chew toy and a system are disclosed that are capable of dispensing a liquid, such as a dentifrice, to the oral cavity of an animal. The toy may comprise one of various shapes such as a ball or a bone shape. The chew toy may provide a reservoir containing a plurality of apertures that dispense the liquid when compressed. The reservoir may provide bristles to brush the animal's teeth during play. The liquid may be a solution that improves dental hygiene, such as fluoride, or in some instances, the solution may promote general health in the animal.

20 Claims, 3 Drawing Sheets

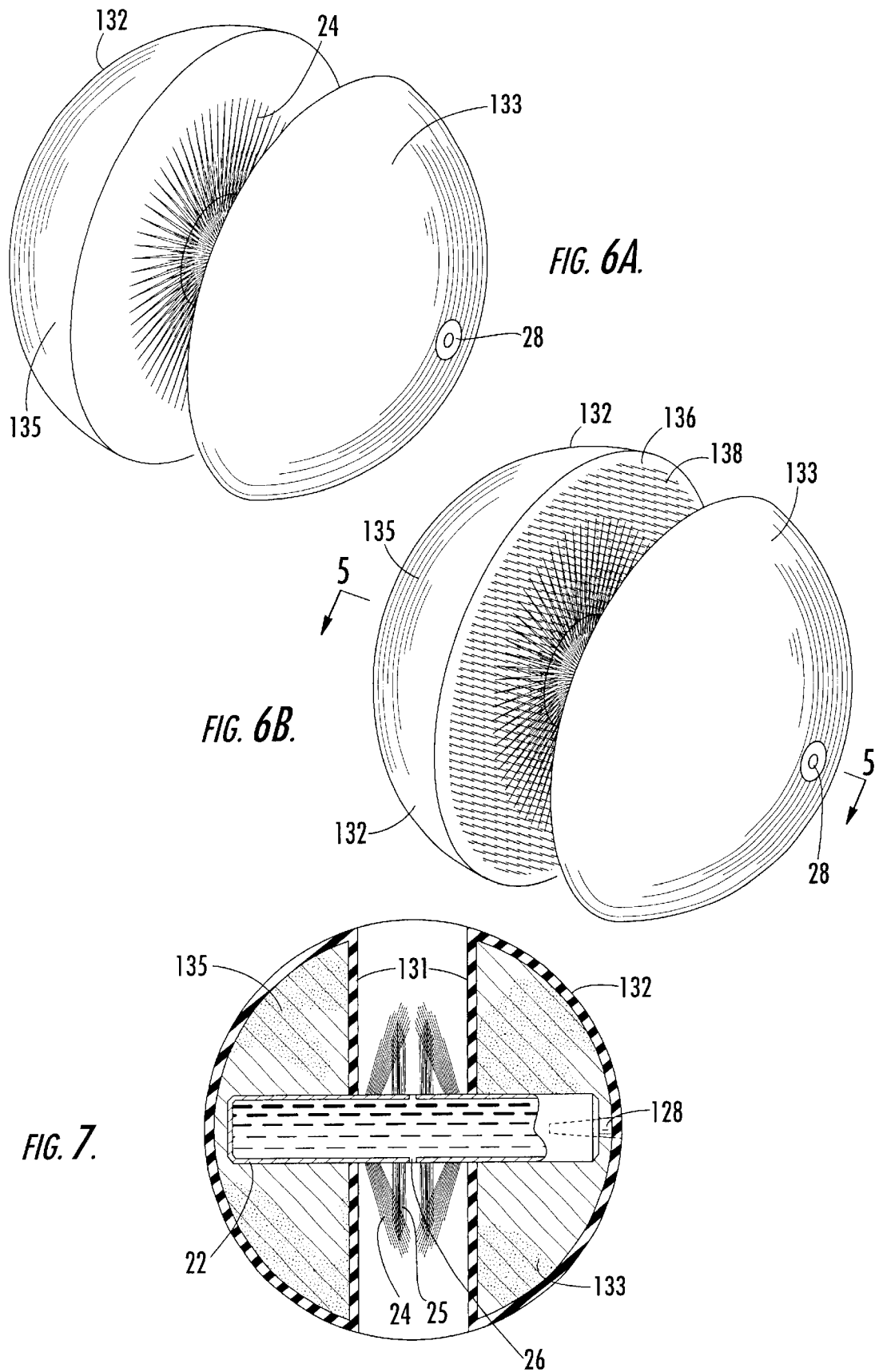

CHEW TOY

BACKGROUND OF THE INVENTION

Domesticated animals, such as cats and dogs, often need dental care to prevent dental problems commonly due to plaque, tartar, tooth decay, gingivitis, periodontal disease, and the like. Some veterinarians recommend brushing the animal's teeth, but as any pet owner knows, such a task is extremely difficult. It is often difficult for the owner to keep the animal's mouth open during brushing, and the process may be extremely unpleasant for the animal and even dangerous to the owner.

Dental care for animals is generally more difficult to manage than dental care for humans. For example, animals do not voluntarily engage in tooth brushing, and therefore an apparatus or system that encourages them to engage in an activity that will brush their teeth while the animal manipulates an apparatus is desirable.

Furthermore, it is difficult to administer a dentifrice or liquid oral care solution to an animal in measured doses. Adding such a solution to a foodstuff may prove wasteful if the animal does not ingest the foodstuff. Further, dog biscuits and the like have been used to provide solid or granular particles to an animal's oral cavity, but applying liquid to the oral cavity of an animal typically is more difficult. Liquids in dishes or water bowls may evaporate, or be spilled.

There are pet toys that hold liquids for animals. For example, U.S. Pat. No. 5,857,431 to Peterson teaches a hollow rubber toy with a plurality of openings that release dentifrice to the animal upon chewing of the toy by the animal. The openings are provided on essentially the entire outer surface of the animal chew toy, providing for release of the dentifrice from multiple points around the outside periphery of the device.

U.S. Pat. No. 5,033,410, issued to Sigurdsson, discloses a chewing object for animals. The toy is constructed of breakable, elastically deformed fibers. The toy is impregnated with a flavoring to attract the animals.

U.S. Pat. Nos. 5,329,881 and 5,467,741, both issued to O'Rourke, disclose a dog chew toy for dental care. The toy is made of a length of cotton rope. The threads are impregnated with fluoride particles.

U.S. Pat. No. 6,044,800, issued to Kubo et al., discloses a dental care toys for pets. The toy is constructed of edible, thread-like, string-like, or thin-tube-like members. The members are twisted into a cord and tied at the ends.

An apparatus or method of applying liquid to an animal's oral cavity in a manner that will brush or clean the teeth of the animal concurrently while dentifrice is being applied to the teeth of the animal would be very desirable. Furthermore, a device that will selectively release dentifrice in measured quantities to the oral cavity of an animal, but not directly to carpeting or furniture in a home, would be desirable. A device that limits the direct contact between apertures releasing dentifrice and flooring or carpeting would be highly desirable. A liquid containing chew toy that is capable of releasing liquid only in response to engagement with an animal's oral cavity at a point that is below the outer surface of the chew toy would be useful. A chew toy that is capable of being refilled when it is empty, so as to prolong the useful lifetime of the toy would be highly desirable.

SUMMARY OF THE INVENTION

The present invention is directed to promoting the general health of animals that people keep as pets. The present invention may aid in the brushing of an animal's teeth, and it may be used to deliver a beneficial substance, such as fluoride, vitamins or mouthwash, to the animal. Moreover, the present invention may be embodied in a shape that promotes play such as a ball or a bone.

In accordance with the present invention, there is provided an animal chew toy capable of administering a liquid to the oral cavity of an animal having:

- a body having more than one surface,
- a reservoir that has a plurality of apertures and that may contain a liquid, and
- at least one channel adapted for receiving a portion of the jaw of an animal and being of a sufficient depth to facilitate communication between the teeth of the animal and the reservoir.

The reservoir may include a means for distributing the liquid to the animal's teeth. The distribution means may include almost any apparatus or mechanism capable of spreading a liquid in an oral cavity in an efficient manner. For example, the apparatus may comprise bristles, a sponge-like material, or another suitable material. The distribution means may be disposed on the reservoir; however, the distribution means may also be disposed on the walls of one or more channels.

The reservoir may also include a valve for the addition of additional fluid to the reservoir such as when the reservoir runs dry and must be refilled. The valve may be of any commonly known type of valve capable of holding a water seal or liquid seal. including one similar to an air valve that is used to inflate a basketball or a football.

The apparatus body may take many different shapes or forms such as a ball, a bone, a "yo-yo" shape, and other forms. In the "ball" embodiment, the body may be generally spherical in shape. The channel may be enclosed by a membrane. The membrane has an opening around its circumference to facilitate penetration by an animal's teeth. The opening may be sinusoidal, or wave-shaped, so that it forms alternating or interlocking projections capable of contacting the interior surfaces of an animal's oral cavity, for example, massaging an animal's gums. Further, shielding the reservoir (and its apertures) from the outer surface of the toy can prevent undesirable spillage of the dentifrice upon the floor and carpeting of the pet owner, reducing waste and undesirable spills of dentifrice.

In the "bone" embodiment, the body may be elongated. The body may include two channels which may be enclosed by membranes. Each membrane may contain a wave-shaped opening to facilitate penetration by the animal's teeth. The two channels may be spaced at a distance such that when an animal bites the toy, both rows of teeth penetrate each respective membrane at the same time.

In the so-called "yo-yo" embodiment, the body is much like that of the "ball" embodiment except that no membrane is present over the channel. However, it may be recognized that a membrane is optional and not required in the practice of the invention. In addition to the bristles on the reservoir, there may also be bristles projecting from the channel walls. In the alternative, the wall mounted bristles may be used without having bristles on the reservoir.

The present invention also encompasses a system for administering a liquid to the oral cavity of an animal. The system includes:

- a reservoir for containing a liquid,
- a body connected to the reservoir,
- at least one channel adapted for receiving a portion of the jaw of an animal and being of a sufficient depth to facilitate communication between the teeth of the animal and the reservoir, and a liquid disposed within the reservoir.

The body may contain one or more channels adapted for penetration by a portion of the jaw of an animal. The channel may contain a means for distributing the liquid, such as bristles. The channel may also be covered by a membrane.

The liquid may be a dentifrice, such as a fluoride containing solution. The liquid may also contain any other beneficial agent, including, but not limited to, flavorings, vitamins, medicines, and the like.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 6A is a perspective view of a third embodiment of the animal dental toy in accordance with the present invention.

FIG. 6B is a perspective view of a third embodiment of the animal dental toy including an optional feature in accordance with the present invention.

FIG. 7 is a cross-sectional view along the line 5—5 of the embodiment shown in FIG. 6B.

DETAILED DESCRIPTION OF THE INVENTION

It will be apparent to those skilled in the art that changes or modifications may be made to the present invention. It is to be understood that the following embodiments are for descriptive purposes only and are not intended to limit the scope of the present invention.

Figure 1:
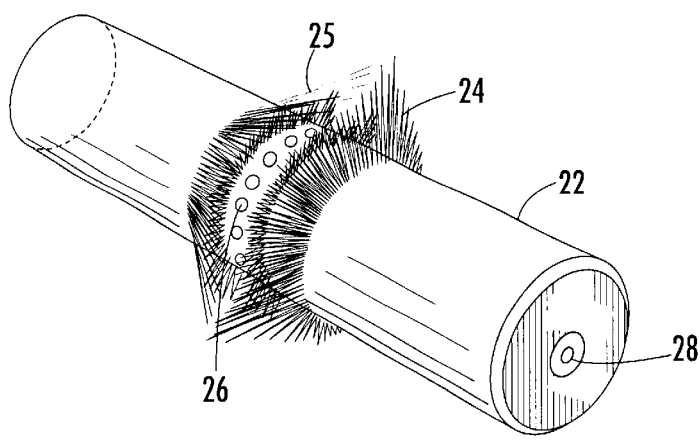
FIG. 1 is a perspective view of one embodiment of a reservoir used in the apparatus of the invention.

In reference to the drawings, in particular to FIG. 1, a reservoir 22 is provided and may be present in several alternate embodiments in all of the drawings presented herein. The reservoir 22 may be made from any material that is flexible enough to allow the apertures 26 to open when the animal chews the toy but durable enough to withstand many hours of play and chewing by the animal. Various natural and synthetic materials are suitable for this purpose. In fact, any flexible and durable material may be used as long as it is not toxic to the animal. Examples of suitable materials include polymers, elastomers, rubberized synthetic materials, natural rubber(s), cellulosic materials, and the like.

The reservoir 22 has one set of apertures 26 around the circumference of the reservoir 22, but there may be more or less apertures provided in an unlimited number of patterns or arrangements. The apertures 26 may be annular, in other various patterns, or may be randomly placed over the exposed area of the reservoir 22. The apertures 26 should be able to open when the toy is compressed, for example, when the animal chews on the toy. When the toy is at rest, the apertures typically remain closed to retain the liquid inside the reservoir 22.

The reservoir 22 may also have bristles projecting from its surface. As pictured in FIG. 1, there are two rows of bristles on each side of the plurality of apertures 26, but more or less bristles in other arrangements may be provided as well. One set of bristles 24 extends from the surface of the reservoir 22 at an angle suitable to contact the sides of the animal's teeth. A second set of bristles 25 extends perpendicularly from the surface of the reservoir 22, as further seen in FIG. 3. The perpendicular bristles 25 are shorter than the angled bristles 24 and are of a length suitable to contact the chewing surfaces of the animal's teeth. In other embodiments, only one set of bristles may be included. These bristles could be angled bristles 24, perpendicular bristles 25, or some other suitable form of bristles. The bristles may be made from natural fibers or from synthetic fibers. In other embodiments, there may be no bristles at all. Instead, any means of providing for the spreading of liquid dentifrice over the surface of the animal's teeth in response to playful contact of the animal with the chew toy may be employed. For example, a sponge-like material may be used that could absorb the liquid from the apertures 26 in the reservoir 22 and distribute the liquid to the animal's teeth. Alternatively, the reservoir 22 may have only the apertures 26 and no bristles or other material for distributing the liquid.

A valve 28 may be located at one end of the reservoir 22. This valve 28 is adapted to provide an input point for the owner to refill the reservoir 22 with liquid. The valve 28 is used as an inlet through which the toy is filled with a liquid, i.e., fluoride, vitamins, medicine, etc. The liquid may be provided for essentially any healthful purpose to the oral cavity of the animal. The reservoir 22 may also include a "window" or transparent section which would allow the pet owner to observe the fluid level in order to determine when to refill the reservoir 22.

Figure 2:
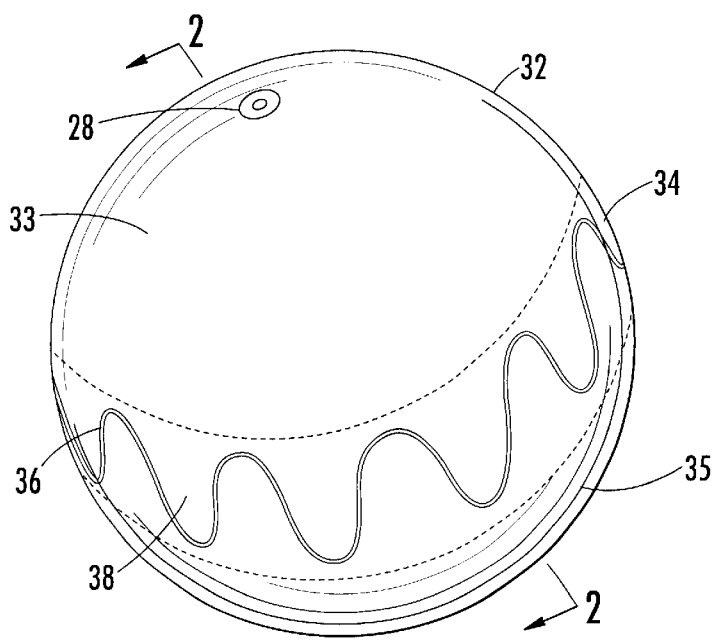
FIG. 2 is a perspective view of a first embodiment ("ball" embodiment) of the animal dental toy in accordance with the present invention.
Figure 3:
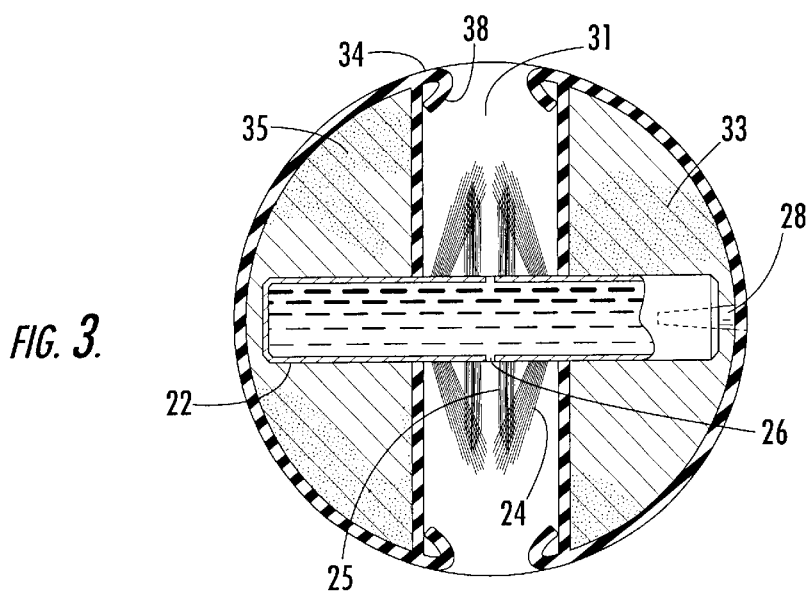
FIG. 3 is a cross-sectional view along line 2—2 of the embodiment shown in FIG. 2.

In FIGS. 2–7, the present invention is shown in several alternate embodiments including a "ball", a "bone", and a "yo-yo". Referring to FIGS. 2 and 3, the body 32 is in a ball configuration. In this embodiment, the body 32 is preferably made from a flexible but durable rubber or similar material. The body 32 has a first end 33 having a first surface and a second end 35 having a second surface, one end being connected to each end of the reservoir 22 at a spaced distance from each other forming a channel 31. The width of the channel 31 is limited only in that it must be wide enough for a portion of an animal's jaw to fit into it.

The body 32 may be attached to the reservoir 22 in any number of ways, or in some embodiments, the reservoir 22 may be integrally formed or molded within an outer body. The first end 33 and second end 35 may be formed separately and have holes bored into them in which the reservoir 22 would fit. The ends of the reservoir 22 may be joined with the ends 33, 35 of the body 32 with an adhesive or by any other suitable means. The ends of the reservoir 22 and the holes bored in the ends 33, 35 of the body 32 may be threaded so that the reservoir 22 screws into the ends 33, 35 of the body 32. Alternatively, the toy may be formed from one molded piece of rubber or other similar material. The toy may also be assembled or formed using any other method known in the art of toys, or more precisely, pet toys.

The channel 31 may be covered by a membrane 34 that extends around the circumference of the body. The membrane 34 may be made of the same materials as the body 32.

The membrane 34 may be part of the mold used in forming the ends of the body, or it may be made separately and attached with adhesive or any other suitable means known in the art. The membrane 34 in FIG. 1 is perforated with a sinusoidal opening 36. The opening forms alternating interlocking projections 38 around the circumference of the body 32. The projections 38 are capable of massaging the animal's gums when the animal bites into the toy, thus providing another benefit to the health of the animal. Further, the projections may assist in spreading the dentifrice upon the teeth of the animal.

Figure 4:
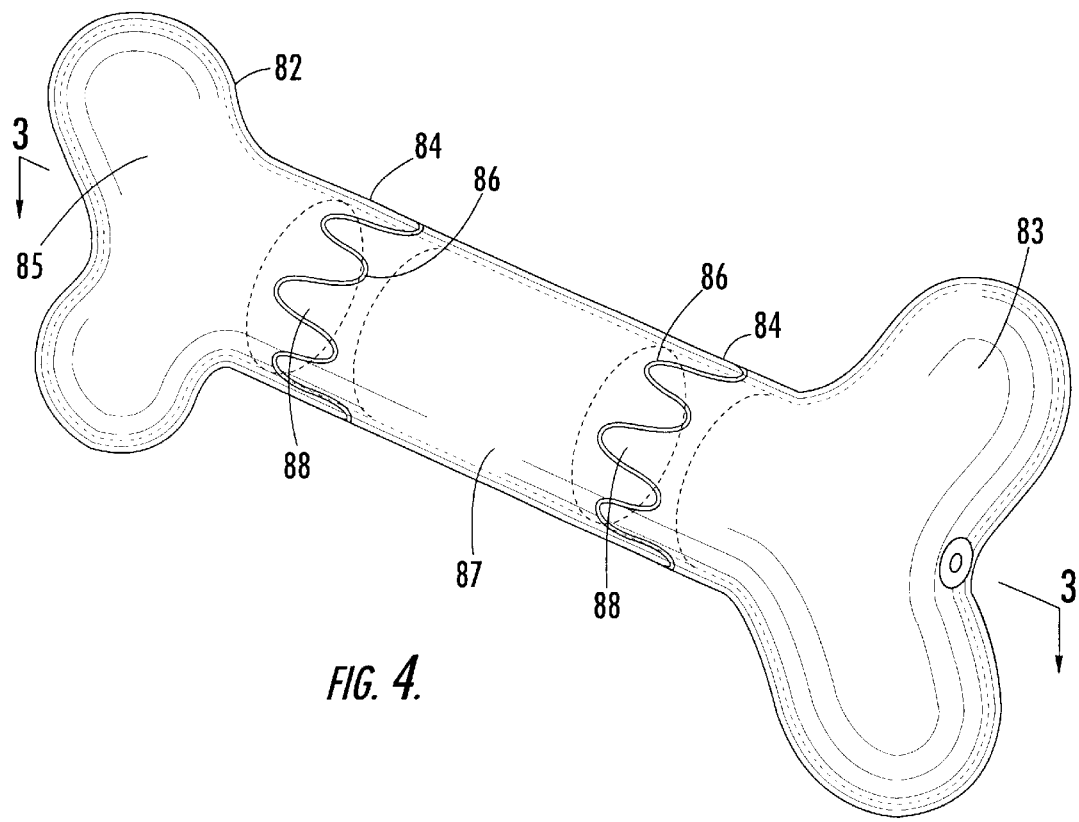
FIG. 4 is a perspective view of a second embodiment ("bone" embodiment) of the animal dental toy in accordance with the present invention.
Figure 5:
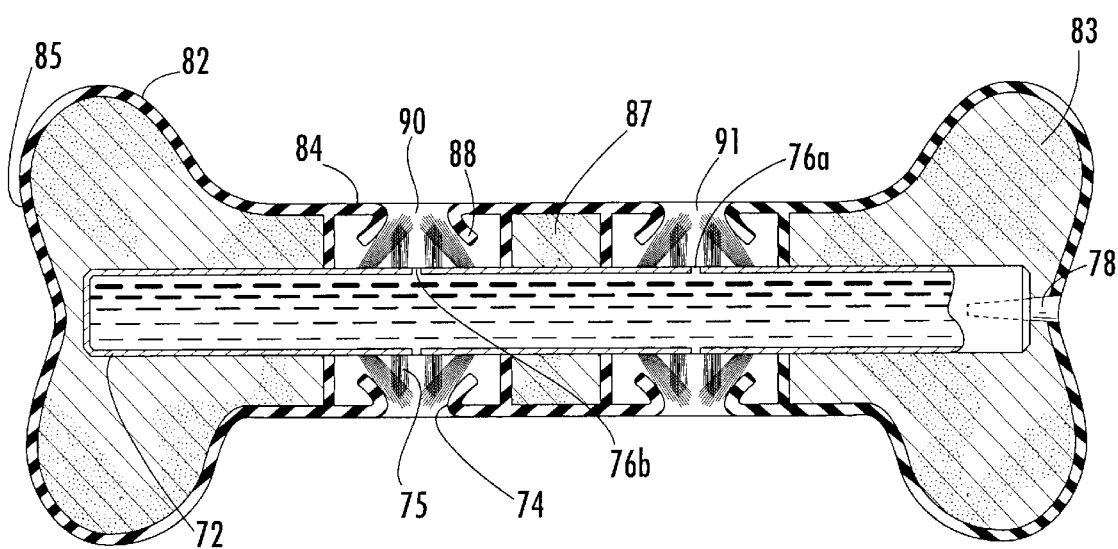
FIG. 5 is a cross-sectional view along line 3—3 of the embodiment shown in FIG. 4.

Referring now to FIGS. 4 and 5, the present invention is shown in the bone embodiment. The bone embodiment may be constructed from any durable and flexible material. The body 82 has a first end 83 having a first surface, a second end 85 having a second surface, and a middle section 87 having a third surface. A first channel 90 is positioned between the first end 83 and the middle section 87. The first channel 90 must be of a sufficient depth to facilitate communication between the animal's teeth and reservoir 72, as seen in FIG. 5. A second channel 91 is positioned between the second end 85 and the middle section 87. The second channel 91 must also be of a sufficient depth to facilitate communication between the animal's teeth and reservoir 72. The width of each channel should be such that one side of an animal's jaw may fit into a channel. The first channel 90 and second channel 91 should be spaced apart enough so that both rows of the animal's teeth may enter the channels simultaneously. Thus, different sized "bones" may be provided for animal's having different sized jaws. This distance may be altered depending on the size of the animal for which the toy is intended. These channels may be covered with a membrane 84 similar to that in the ball embodiment. The membranes 84 may be attached to the body 82 in the methods discussed in the description of the ball embodiment. Each membrane 84 may be perforated with an opening 86. In FIGS. 4 and 5, the opening 86 is sinusoidal, or wave-shaped, so that alternating interlocking projections 88 are formed.

Having more than one channel requires the use of a slightly altered reservoir 72. The reservoir 72 has two sets of apertures 76 similar in nature to those shown in the ball embodiment. These sets of apertures 76a and 76b should be spaced so that they are in communication with the channels in the body 82. The reservoir 72 may also include a valve 78 similar to that in the ball embodiment.

Referring now to FIGS. 6A, 6B, and 7, the body 132 is depicted in the yo-yo embodiment. This embodiment is similar to the ball embodiment of FIGS. 2 and 3. The body 132 contains the same reservoir 22 as the ball embodiment and is constructed from the same materials. The yo-yo has a first end 135 and a second end 133. The reservoir 22 connects the two ends. The ends and the reservoir 22 may be connected by any of the methods described above for the ball embodiment including, but not limited to, adhesives, threading, molding as a single piece, etc.

The yo-yo has a channel 131 which may not be covered by a membrane like the ball. The width of the channel 131 is limited only in that it must be wide enough for an animal's teeth to fit into it.

In addition to the liquid distribution device on the reservoir 22, a second distribution device may be placed on the channel walls 136. This second distribution device may be any of the devices mentioned for use with the reservoir 22. In FIG. 6B, the second distribution device is a plurality of wall-mounted bristles 138. These wall-mounted bristles 138 may be added to a yo-yo containing reservoir-mounted bristles in the angled 24 or perpendicular 25, or both. The wall-mounted bristles 138 may also be used without any reservoir-mounted bristles.

The liquid (not shown) used in the present invention may be one of many different substances. For instance, the liquid may be a fluoride solution to strengthen the animal's teeth, a vitamin solution to keep the animal physically healthy, or a solution with medicinal properties. The liquid may be flavored to attract the animal and encourage play. Some of the flavors that may be used include, but are not limited to, beef, chicken, fish, pork, etc. Any flavor or scent that attracts the animal will be suitable.

It should be appreciated by those skilled in the art that various modifications and variations can be make in the present invention without departing form the scope and spirit of the invention. For example, features illustrated as part of one embodiment can be used on another embodiment to yield still further embodiments. Such modifications and variations are within the scope and spirit of the invention and appended claims.

What is claimed is:

1. An apparatus for administering a liquid to the oral cavity of an animal comprising:
   a body having more than one surface;
   a reservoir, said reservoir being located within said body, said reservoir being capable of containing a liquid, said reservoir further comprising a plurality of apertures in an outer surface, said apertures being capable of dispensing a liquid; and
   at least one channel adapted for receiving a portion of the jaw of an animal, said channel being defined by a first wall extending from said reservoir outer surface to a first body surface and a second wall extending from said reservoir outer surface to a second body surface, said channel being of a sufficient depth to facilitate communication between the teeth of the animal and said reservoir.

2. An apparatus as defined in claim 1, wherein said reservoir further comprises a means for dispersing a liquid to the teeth of an animal.

3. An apparatus as defined in claim 1, wherein said reservoir further comprises a valve for addition of a fluid to said reservoir.

4. An apparatus as defined in claim 1, wherein said body is generally spherical in shape.

5. An apparatus as defined in claim 1, wherein said body is elongated.

6. An apparatus as defined in claim 5, wherein said body further comprises two channels.

7. An apparatus for administering a liquid to the oral cavity of an animal comprising:
   a body having more than one surface;
   a reservoir, said reservoir being located within said body, said reservoir being capable of containing a liquid, said reservoir further comprising a plurality of apertures in an outer surface, said apertures being capable of dispensing a liquid; and
   at least one channel adapted for receiving a portion of the jaw of an animal, said channel being of a sufficient depth to facilitate communication between the teeth of the animal and said reservoir, said channel comprising a plurality of bristles adapted to disperse said liquid to the oral cavity of an animal.

8. An apparatus for administering a liquid to the oral cavity of an animal comprising:
   a body having more than one surface;

a reservoir, said reservoir being located within said body, said reservoir being capable of containing a liquid, said reservoir further comprising a plurality of apertures in an outer surface, said apertures being capable of dispensing a liquid; and at least one channel adapted for receiving a portion of the jaw of an animal, said channel comprising walls of a sufficient depth to facilitate communication between the teeth of the animal and said reservoir, said channel comprising a plurality of bristles disposed on said walls of said channel.

9. An apparatus for administering a liquid to the oral cavity of an animal comprising:

a body having more than one surface, said body being generally spherical in shape;

a reservoir, said reservoir being located within said body, said reservoir being capable of containing a liquid, said reservoir further comprising a plurality of apertures in an outer surface, said apertures being capable of dispensing a liquid; and at least one channel adapted for receiving a portion of the jaw of an animal, said channel being of a sufficient depth to facilitate communication between the teeth of the animal and said reservoir, said channel being enclosed by a membrane, said membrane having an opening to facilitate penetration by an animal's teeth.

10. An apparatus as defined in claim 9, wherein said opening is wave-shaped, said opening forming projections capable of interaction with the interior surfaces of an animal's oral cavity.

11. An apparatus for administering a liquid to the oral cavity of an animal comprising:

an elongated body having more than one surface;

a reservoir, said reservoir being located within said body, said reservoir being capable of containing a liquid, said reservoir further comprising a plurality of apertures in an outer surface, said apertures being capable of dispensing a liquid; and two channels adapted for receiving a portion of the jaw of an animal, each said channel being of a sufficient depth to facilitate communication between the teeth of the animal and said reservoir, each said channel being covered by a membrane, said membrane having an opening around the circumference of said membrane which facilitates penetration of an animal's teeth.

12. An apparatus as defined in claim 11, wherein said opening is wave-shaped.

13. A system for administering a liquid to the oral cavity of an animal comprising:

a reservoir for containing and dispensing a liquid, said reservoir further comprising a plurality of apertures, said apertures being capable of dispensing said liquid;

a body connected to said reservoir;

at least one channel adapted for receiving a portion of the jaw of an animal, said channel being defined by a first wall extending from said reservoir to said body and a second wall at a distance from said first wall extending from said reservoir to said body, said channel being of a sufficient depth to facilitate communication between the teeth of the animal and said reservoir; and a liquid, said liquid being disposed within said reservoir.

14. The system for administering a liquid as in claim 13, wherein said liquid further comprises a dentifrice.

15. The system for administering a liquid as in claim 14, wherein said dentifrice comprises a fluoride containing solution.

16. The system as in claim 13, wherein said channel comprises a means for distributing the liquid to the oral cavity of an animal.

17. The system of claim 13 in which at least two channels are provided.

18. A system for administering a liquid to the oral cavity of an animal comprising:

a reservoir for containing and dispensing a liquid, said reservoir further comprising a plurality of apertures, said apertures being capable of dispensing said liquid;

a body connected to said reservoir;

at least one channel adapted for receiving a portion of the jaw of an animal, said channel being of a sufficient depth to facilitate communication between the teeth of the animal and said reservoir; and a liquid, said liquid being disposed within said reservoir, wherein said channel comprises a means for distributing the liquid to the oral cavity of an animal, said means for distributing liquid comprising a brush means.

19. The system of claim 18 in which the brush means comprises bristles.

20. The system of claim 19 in which the channel is covered by a membrane.

* * * * *